United States Patent
Ying et al.

(10) Patent No.: US 7,554,973 B2
(45) Date of Patent: Jun. 30, 2009

(54) MULTIPLE VIRTUAL TELEPHONES SHARING A SINGLE PHYSICAL ADDRESS

(75) Inventors: Chun Ying, Beijing (CN); Wei Lu, Beijing (CN); Dong Liu, Beijing (CN); Qing Bo Wang, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 11/088,351

(22) Filed: Mar. 24, 2005

(65) Prior Publication Data

US 2005/0232253 A1 Oct. 20, 2005

(30) Foreign Application Priority Data

Mar. 31, 2004 (CN) .................... 2004 1 00320044

(51) Int. Cl.
*H04L 12/66* (2006.01)
*H04L 12/28* (2006.01)
*H04L 12/56* (2006.01)

(52) U.S. Cl. .................... 370/356; 370/353; 370/354; 370/392

(58) Field of Classification Search ......... 370/352–356, 370/389, 392
See application file for complete search history.

(56) References Cited

U.S. PATENT DOCUMENTS

| 6,188,751 | B1 | 2/2001 | Scherer .................... 379/88.22 |
| 6,731,630 | B1* | 5/2004 | Schuster et al. ............. 370/356 |
| 7,315,882 | B1* | 1/2008 | Koch ........................... 709/206 |
| 7,324,443 | B2* | 1/2008 | Chuah et al. ................. 370/230 |
| 7,330,824 | B1* | 2/2008 | Kanojia et al. ................. 705/14 |
| 2001/0038689 | A1 | 11/2001 | Liljestrand et al. |
| 2002/0137490 | A1 | 9/2002 | Gallant |
| 2003/0002651 | A1 | 1/2003 | Shires |
| 2004/0260753 | A1* | 12/2004 | Regan ........................ 709/200 |
| 2008/0205605 | A1* | 8/2008 | Gao et al. ................. 379/88.22 |

* cited by examiner

*Primary Examiner*—Ronald Abelson
(74) *Attorney, Agent, or Firm*—Michael J. Buchenhorner; Vazken Alexanian; Louis P. Herzberg (57) ABSTRACT

A shared multi-user IP telephone device for receiving, based on SIP, calls transmitted over VoIP network, a system using such a device and method thereof. The shared multi-user IP telephone device includes a storage device for storing user profiles, an ID extraction portion for receiving from the VoIP network a SIP packet including at least the callee's ID, and extracting the ID contained in the SIP packet, and a personalized feature presentation portion for searching in the storage device for the user profile corresponding to the ID according to the extracted ID for presenting the corresponding personalized feature according to the search result. Thus it is possible for everyone using such a phone to receive directly the call for him/herself without anyone else or other device forwarding the call.

19 Claims, 6 Drawing Sheets

Prior Art

Fig. 1a

Prior Art

Fig. 1b

Prior Art

MULTIPLE VIRTUAL TELEPHONES SHARING A SINGLE PHYSICAL ADDRESS

TECHNICAL FIELD

The present invention relates to a IP telephone device, a IP telephone system and method thereof, and more specifically to a telephone device that enables several virtual telephones to share a single physical IP address on a VoIP network, a telephone system that enables several virtual telephones to share a single physical IP address on a VoIP network, and a method for several virtual telephones to share a single physical IP address on a VoIP network.

BACKGROUND TECHNOLOGY

The telephone plays a very important role in our lives. According to its mode of usage, the telephone can be classified into two rough categories. One is the category of telephones that are used in an exclusive single-user mode, whereby the callee of incoming call is often the user of the telephone himself. The other is the category of telephones that are used in a shared multi-user mode, whereby the callee of incoming call is someone in the group of user sharing the telephone. One problem with a telephone of the shared multi-user mode lies in the fact that it can tell who is the callee from an incoming call, because most signal systems (e.g. H323 telephone system) adopt particular name spaces, which are related to the device used instead of human names.

Figure 1A:
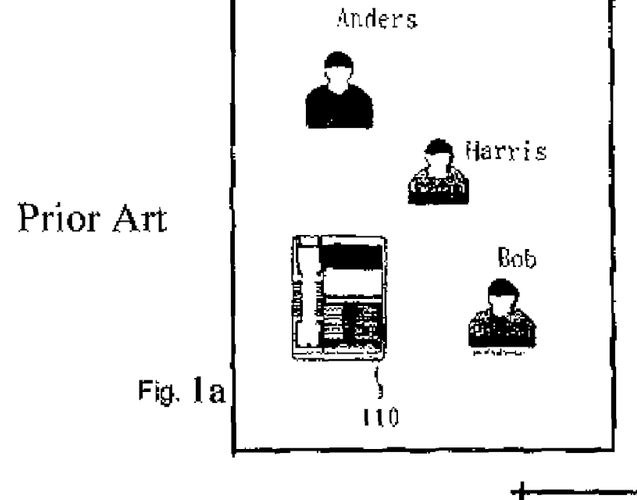
FIG. 1A illustrates an example of telephone in shared multi-user mode installed in a small office.
Figure 1B:
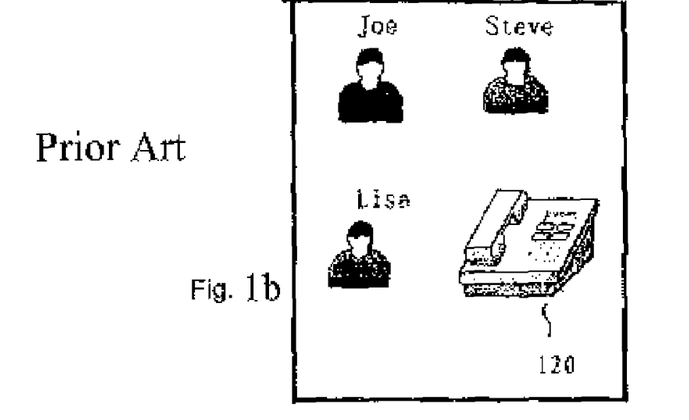
FIG. 1B illustrates an example of telephone in shared multi-user mode installed in conference room.
Figure 1C:
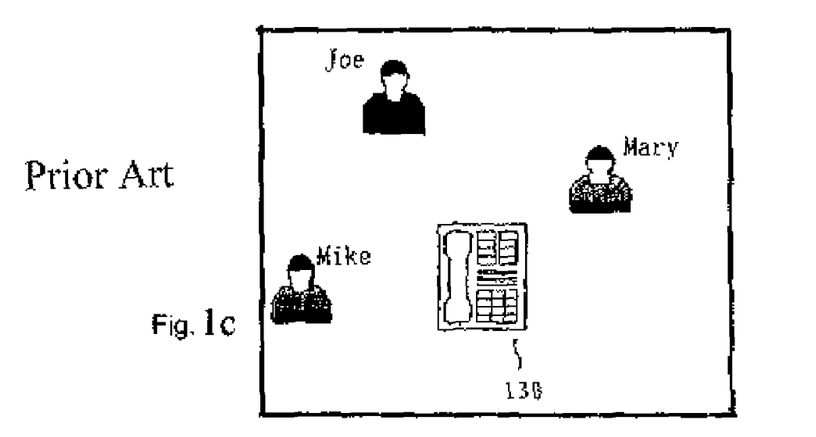
FIG. 1C illustrates an example of telephone in shared multi-user mode installed in a home.

FIGS. 1A-1C illustrate respective examples of telephone of shared multi-user mode. FIG. 1A illustrates an example of shared multi-user telephone installed in a small office. In the small office shown in FIG. 1A, for some reason (e.g. to save budget), is installed only one telephone 110, for example, shared by Anders, Harris and Bob. In such case, everyone in the small office will print the number of this telephone on his/her business card. Since the answerer (e.g. Anders) of a call may not be the callee (e.g. Harris), the answerer will always ask the caller whom is to be called. This is inconvenient and so annoying to the call's answerer that no one is willing to take up the call, thereby causing many unfavorable consequences. One such consequence is that the telephone will ring for a long time, affecting everyone working in the office, or even will never be taken up until hung up. However, such a call may be important business call, and no one taking it up until hung up may result in lost opportunities. As for the caller as business partner, he/she may be unsatisfied with someone else forwarding the call to the caller and/or the inconvenience caused by having to wait for a long time. Obviously, this will bring negative impact to the business image of the small office.

To such a problem, the conventional solution is to assign someone to taking up calls, who is responsible to answer all incoming calls. Although this solution can avoid the situation where business opportunities be lost because no one answers the phone, it sill cannot overcome the aforementioned problems due to manual answering. Besides, the solution will increase the cost of running a small office.

FIG. 1B illustrates an example of shared multi-user telephone installed in a conference room. In the conference room shown in FIG. 1B, is installed only one telephone 120, which can be used by every participant of the conference. FIG. 1B shows that Joe, Steve and Lisa participate in the conference. In some corporations, a PBX (Private Branch Exchange) system provides call-forwarding function. Staff members can use this function to forward his/her office call to the telephone in the conference room before the conference starts, so that he/she can receive the incoming call to his/her office telephone in a timely manner. In such a case, there also occurs the same problem as with the shared telephone in a small office.

To such a problem, the conventional solution is to show the caller's name. By displaying the caller's name on the telephone, someone near the telephone will know who the callee is for the call. The caller's name is the identifier of the callee's office telephone. However, this solution depends on the available functions provided by office PBX and telephone system. To see clearly the caller's name displayed on the telephone, the telephone is often placed near the conference participants, thereby resulting into noise.

FIG. 1C illustrates an example of shared multi-user telephone installed in a home. In the home shown in FIG. 1C, is installed one telephone 130, which is shared by family members (e.g. Joe, Mary and Mike). The answerer of a call always asks who it is. Obviously this will bring about inconvenience to the family members. For instance, my brother has an American friend, who sometimes calls my brother to chat. Sometimes when the American friend calls, my brother is far away from the telephone and my father takes up the phone. However, since my father does not understand the American's language, it takes a long time to understand whom the caller wants to talk to.

To such a problem, the conventional solution is to show the caller's name. By displaying the caller's name on the telephone, someone near the telephone will know who the callee is for the call, thereby choosing who is answering the call. However, when the caller places a call from nonfamiliar telephone number, the answerer has no way to tell who the callee is.

Therefore, there is a need to provide a novel telephone device of shared multi-user mode, capable of providing a virtual telephone for every user such that every answerer of a call will feel that the telephone is exclusively for him/her, with virtual telephones sharing a single physical IP address.

SUMMARY OF INVENTION

Therefore, the present invention provides a shared multi-user IP telephone device for receiving, based on SIP, calls transmitted over VoIP network, and an IP telephone system that enables a shared multi-user IP telephone device to share single physical IP address on a VoIP network. The shared multi-user IP telephone device receives via the VoIP network the SIP packet which comes from a calling device and includes a user ID, parses the received SIP packet to determine and extract the ID, and presents a personalized feature associated with the extracted ID.

To achieve this and other objects, there is provided a shared multi-user IP telephone device which receives, based on SIP, a call transmitted over a VoIP network, with the shared multi-user IP telephone device serving as a SIP user agent, and creating and managing a session between a caller and a callee according to SIP, wherein the shared multi-user IP telephone device includes: a storage device for storing associatively in the form of a database a user profile including a user ID and a personalized feature descriptor corresponding to the user ID; an ID extraction portion for receiving from the VoIP network a SIP packet including at least the callee's ID, and extracting the ID contained in the SIP packet, wherein the ID is unique for every user on the VoIP network; and a personalized feature presentation portion for searching in the storage device for the user profile corresponding to the ID according to the ID extracted by the ID extraction portion, for presenting the personalized feature according to the search result.

According to one embodiment of present invention, the ID extraction portion of the shared multi-user IP telephone device includes: a receiving device for receiving from the VoIP network the SIP packet including at least the callee's ID; and an incoming call parsing device for extracting at least the callee's ID from the SIP packet output from the receiving device.

To achieve the above and other objects, there is also provided a method for registering a user in a shared multi-user IP telephone device which includes a storage device, including: determining the method to receive user data; receiving an ID and an instruction of the user with the determined receiving method; and receiving or retrieving an user profile and storing the user profile in the storage device, or deleting an user profile in the storage device, according to the user instruction.

BRIEF DESCRIPTION OF THE DRAWINGS

For a more complete understanding of the present invention and the advantage thereof, reference is now made to the following description taken in conjunction with the accompanying drawings, in which.

DETAILED DESCRIPTION OF THE INVENTION

The present invention provides systems, apparatus and methods to provide a shared multi-user IP telephone device for receiving, based on SIP, calls transmitted over VoIP network, and an IP telephone system that enables a shared multi-user IP telephone device to share single physical IP address on a VoIP network. The shared multi-user IP telephone device receives via the VoIP network the SIP packet which comes from a calling device and includes a user ID, parses the received SIP packet to determine and extract the ID, and presents a personalized feature associated with the extracted ID.

There is provided a shared multi-user IP telephone device which receives, based on SIP, a call transmitted over a VoIP network, with the shared multi-user IP telephone device serving as a SIP user agent, and creating and managing a session between a caller and a callee according to SIP, wherein the shared multi-user IP telephone device includes: a storage device for storing associatively in the form of a database a user profile including a user ID and a personalized feature descriptor corresponding to the user ID; an ID extraction portion for receiving from the VoIP network a SIP packet including at least the callee's ID, and extracting the ID contained in the SIP packet, wherein the ID is unique for every user on the VoIP network; and a personalized feature presentation portion for searching in the storage device for the user profile corresponding to the ID according to the ID extracted by the ID extraction portion, for presenting the personalized feature according to the search result.

According to one embodiment of present invention, the ID extraction portion of the shared multi-user IP telephone device includes: a receiving device for receiving from the VoIP network the SIP packet including at least the callee's ID; and an incoming call parsing device for extracting at least the callee's ID from the SIP packet output from the receiving device.

According to another embodiment of present invention, the personalized feature presentation portion of the shared multi-user IP telephone device includes: a user profile mapping device for searching, according to the ID extracted by the ID extraction portion, for the user profile corresponding to the IDs in the storage device; a personalized feature preparation device for preparing presentation data of the personalized feature according to a personalized feature descriptor in the user profile searched by the user profile mapping device; and a personalized feature presentation device for presenting on the shared multi-user IP telephone device the presentation data of personalized feature prepared by the personalized feature preparation device.

According to another embodiment of present invention, the shared multi-user IP telephone device further includes a user registration portion for receiving the user ID, receiving, deleting, or retrieving corresponding user profile over the VoIP network according to a user instruction, and storing the corresponding user profile in the storage device.

There is also provided a method for registering a user in a shared multi-user IP telephone device which includes a storage device, including: determining the method to receive user data; receiving an ID and an instruction of the user with the determined receiving method; and receiving or retrieving an user profile and storing the user profile in the storage device, or deleting an user profile in the storage device, according to the user instruction.

The shared multi-user IP telephone device, by the means of a personalized feature presented and associated with ID, enables every user of the shared multi-user IP telephone device to know whether the incoming call is for him/her before answering the phone and to know the personalized feature of the caller's profile and so on. Thus, there are virtualized telephones one for each user, thus making every user feel that the telephone is exclusive for him/her, while these virtualized telephones share a single physical IP address.

There is also provided an IP telephone system that enables a shared multi-user IP telephone device to share a single physical IP address on a VoIP network, with every user on the VoIP network having a unique ID, including: a calling device for receiving at least the callee's ID and encapsulating it in a SIP packet, and transmitting the SIP packet to the VoIP network so that the SIP packet is routed through the VoIP network based on a SIP routing mechanism; and a shared multi-user IP telephone device for serving as a SIP user agent, creating and managing a session between the caller and the callee according to SIP, including: a storage device for storing associatively in the form of a database a user profile including a user ID and a personalized feature descriptor corresponding to the user ID, an ID extraction portion for receiving from the VoIP network the SIP packet, and extracting the ID contained in the SIP packet from the received SIP packet, and a personalized feature presentation portion for searching in the storage device for the user profile corresponding to the ID according to the ID extracted by the ID extraction portion, for presenting the personalized feature according to the search result.

There is also provided a method for a shared multi-user IP telephone device to share a single physical IP address on a VoIP network, with every user on the VoIP network having a unique ID, including: receiving at least the callee's ID and encapsulating it in a SIP packet, and transmitting the SIP packet to the VoIP network so that the SIP packet is routed through the VoIP network based on a SIP routing mechanism; extracting the ID contained in the SIP packet from the SIP packet received over the VoIP network; and searching for the user profile corresponding to the ID according to the extracted ID, and producing and presenting a personalized feature according to the search result, wherein the user profile is stored in a storage device in the form of database.

In the aforementioned IP telephone system, each user is assigned a unique ID, which can be considered to be name for the user ID. In the shared multi-user telephone, the device maintains user IDs and their associated user profiles for several registered users. By the means of transmitting the callee's ID to the inventive shared multi-user IP telephone device, the shared multi-user IP telephone device retrieves the ID and its corresponding user profile, and presents the callee's personalized feature so that the user can tell whether the call is for him/her. Thus, the problem is overcome in contrast to the traditional telephone whereby the call's answerer is not the callee of the incoming call but someone else sharing the telephone.

The following is a detailed description of advantageous embodiments of present invention in conjunction with the drawings. Throughout the drawings, the same reference number refers to the same parts. For the sake of clarity in the following description, some technical terms used herein are first defined.

SIP Session

An SIP (Session Initiation Protocol) session generally involves a SIP user agent, a SIP registration server, a SIP agent server and a SIP redirection server. The SIP session is performed by transmitting messages including those based on SIP. The setup procedure for a SIP session is as follows: A caller SIP user agent sends messages to the SIP agent server to request establishing a session with a callee user agent. Upon receipt of the request of caller user agent for session setup, the SIP agent server sends request to a SIP registration server and asks for the information on callee user agent's address and so on, where the SIP registration server is a database comprising of information about all the user agents in the domain. Next, if the obtained address is located within the same domain as that of the caller user agent, the SIP agent server will forward the session invitation information directly to the callee user agent. If the obtained address is located within the same domain as that of the caller user agent, the SIP agent server will forward the session invitation information to a SIP redirection server. The SIP redirection server will redirect the SIP session invitation information toward an external domain. Thus, a SIP session will be established between the caller SIP user agent and the caller user agent.

Identification (ID)

The user ID is used for uniquely identifying an user in the VoIP network. The user ID is assigned by the VoIP network to its user. The user ID may be stored in the SIP registration server so that the network may use it as user SIP address to search for a user. In the present invention, the user ID is also a part of the same user profile content. In the following description, the user ID is considered as user SIP address.

Figure 2:
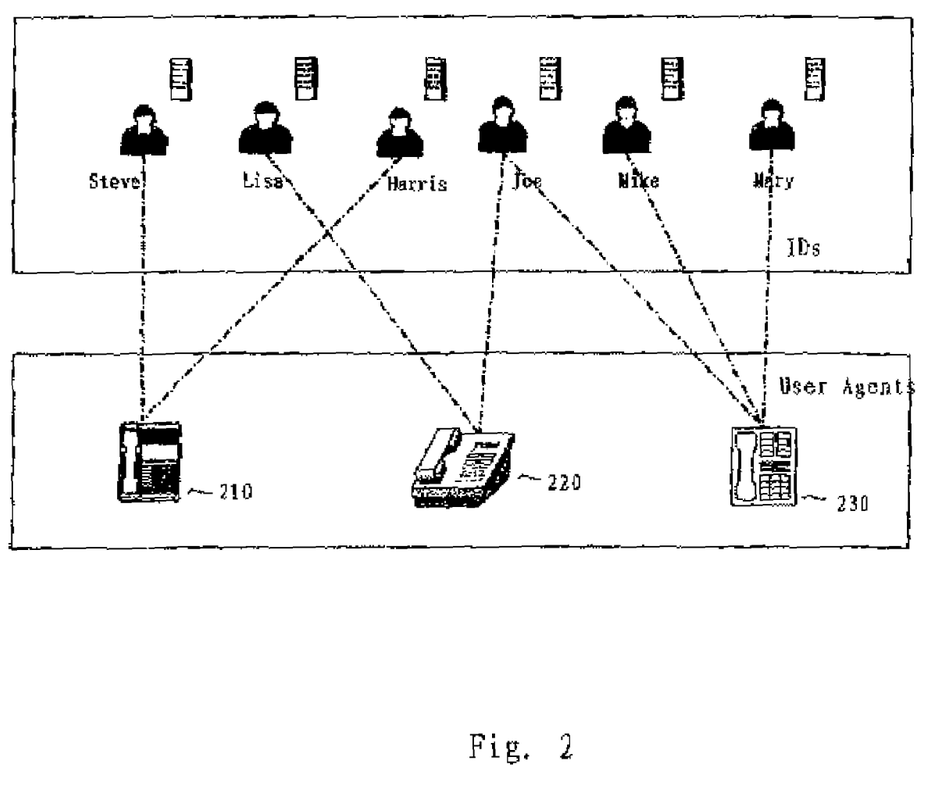
FIG. 2 illustrates the mapping relationship between user IDs and user agents.

FIG. 2 illustrates the mapping relationship between user IDs and user agents. In reference to FIG. 2, the ID is a unique identifier for an entity such as a person. IDs are assigned by the VoIP network to entities. The key characteristic of an entity is its ID (name of the entity). IDs of many entities make up a name space. Such a name space is independent from specific device names. FIG. 2 shows IDs of Steve, Lisa, Harris, Joe, Mike and Mary.

A user agent may be software or hardware device. The key characteristic of user agent is the name existing in the context of namespace. In a namespace, the name is unique. For instance, 86-10-62789890 is the name for a POTS (Plain Old Telephone Service) phone, and 13678987766 is the name for a GSM (Global Systems for Mobile communications) mobile phone. For example, as shown in FIG. 2, with telephones 210, 220 and 230 serving as user agents, IDs of Steve and Harris are associated with phone 210, IDs of Lisa and Joe with phone 220, and IDs of Joe, Mike and Mary with phone 230. As shown in FIG. 2, an ID may be associated with different user agents at different location and time. For instance, the ID of Joe is associated with phone 220 and phone 230 respectively. In the telephone system of present invention, every user is assigned a unique user ID, which may be deemed as user's SIP address.

In the present invention, the term "entity" is substituted by the term "user" sometimes.

Personalization

A user's personalized feature represents the audio or video data preferred by the user. It is used for distinguishing the user from other users of the shared multi-user telephone. In the present invention, this personalized feature is used as the content of incoming call notification, such as a phone ringtone. Here, the audio data may be music data or the data of voice announcement of user's name while the video data may be a user's picture, a scene picture, or a movie clip.

Personalization Descriptor

A personalized feature descriptor is a script to implement personalized feature. According to the personalized feature descriptor, the shared multi-user telephone of present invention may produce the presentation data of personalized feature presented by the telephone to users. For instance, the personalized feature descriptor may be such data as follows: the call for Joe is notified with the voice announcement of "Joe", the call for Mary with the music note of "Post Carriage" and the call for Mike with his facial picture plus regular phone ring. The telephone device will produce respectively the voice announcement of "Joe", the music note of "Post Carriage", and Mike's facial picture plus regular phone ring as corresponding personalized feature presentation data in accordance with the aforementioned personalized feature descriptors.

User Profile

Hereafter, the term "user profile" refers to data including user's personal information. The user profile of a user may include ID, name, title, preference, personalized feature descriptor and so on of the user. The user profile of a user is typically stored in a database in the form of a data record. In the user profile, the user ID and personalized feature descriptor may be stored as a data record in the database in one-to-one, one-to-many, and many-to-one association. For instance, the relationship between user ID and personalized feature descriptor may be stored as a field in the user profile.

In the shared multi-user IP telephone device of the present invention, there are maintained server registered user profiles, including the profile of the entity that may call the shared multi-user IP telephone device (for the sake of convenience, it is also referred to as user profile of the shared multi-user IP telephone device).

Hereafter are explained an example of the IP telephone system where many virtual telephones share a single physical IP address over VoIP network according to the present invention.

Figure 3:
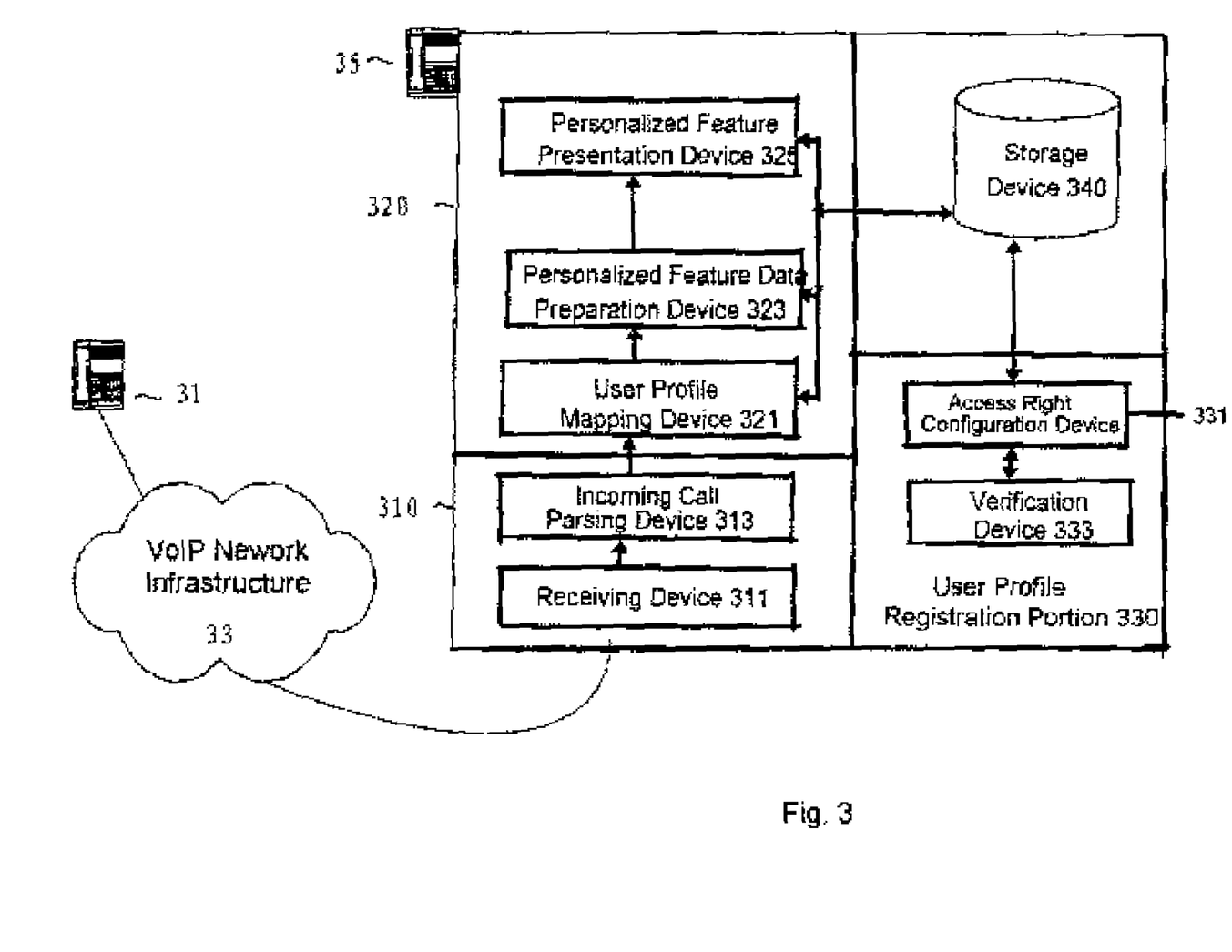
FIG. 3 illustrates an IP telephone system with several virtual telephones sharing a single IP address over VoIP network according to one embodiment of present invention.

FIG. 3 illustrates the architecture of an IP telephone system with several virtual telephones sharing a single IP address over VoIP network according to one embodiment of present invention. In reference to FIG. 3, the system includes calling device 31, VoIP network infrastructure 33 and shared multi-user IP telephone device 35. The calling device 31 has an IP address assigned by VoIP network and it may initiate a call through the callee's ID (e.g. the callee's SIP address). Before the call is initiated, the calling device 31 encapsulates the call message of the caller through VoIP software (SIP user agent), so that the callee's SIP (the callee's SIP address) is encapsulated in the SIP packet. The calling device 31 then send the encapsulated SIP packet to the VoIP network infrastructure 33 to request the VoIP network to establish SIP session.

The VoIP network infrastructure 33 is a network based on SIP, on which a device is uniquely identified with the IP address assigned by the network. The VoIP network infrastructure 33 includes a SIP user agent, a SIP registration server, a SIP agent server, a SIP redirection server (not shown) and so on, which are basic means to establish the SIP session. The encapsulated SIP packet, which is sent by the calling device 31 to the VoIP network infrastructure 22, is routed to the shared multi-user IP telephone device 35 according to the SIP routing mechanism, to set up the SIP session between the caller and the callee.

Notably, since callees are respectively assigned unique IDs in VoIP network and these IDs are the callees' addresses, the SIP packet encapsulating the callee's SIP address corresponds to a unique callee.

The shared multi-user IP telephone device 35 of the IP telephone system of present invention includes an ID extraction portion 310, a personalized feature presentation portion 320 and a storage device 340.

The storage device 340 stores user profiles. As stated before, the user profile (and user ID in turn) comprises the personalized feature descriptor and user ID of the user. Therefore, the corresponding personalized feature descriptor may be located through the user ID. User profiles, which are stored in the storage device 40, may be stocked therein in advance by the manufacturer of the shared multi-user IP telephone device 35 as requested by the customer, or may be stored therein when the user utilizes the shared multi-user IP telephone device 35. In the latter case, the shared multi-user IP telephone device 35 will further include a registration portion 330, which will be further described latter.

Notably, in one user profile, there are typically one ID and one personalized feature descriptor. If required, there may be two or more IDs and one personalized feature descriptor, or may be one ID and two or more personalized feature descriptors corresponding to the ID. In respect to the user profile with two or more IDs and one personalized feature descriptor, it is allowed to retrieve or search both with one of the IDs as the keyword and with two or more IDs as the keyword.

The ID extraction portion 310 extracts the callee's ID from the SIP packet which are sent by the calling device 31 through VoIP network. The ID extraction portion 310 then parses the call of the caller to determine and extract the callee's ID.

Specifically, the ID extraction portion 310 includes receiving device 311 and incoming call parsing device 313. The receiving device receives from VoIP network the SIP packet sent by the calling device 31, and performs the conventional treatment. The incoming call parsing device 313 parses out the callee's ID from the data input from the receiving device 311.

The personalized feature presentation portion 320 includes a user profile mapping device 321, a personalized feature data preparation device 323 and a personalized feature presentation device 325. According to the ID extracted by the ID extraction portion 310, the personalized feature presentation portion 320 searches for the user profile that corresponds to the ID in the storage device 340, and according to the result of the search, presents the corresponding personalized feature.

Specifically, according to the callee's ID parsed out by the incoming call parsing device 313, the user profile mapping device 321 searches for the corresponding data record (a user profile) in stored in the storage device 340. As stated above, in the data record, the ID and the personalized feature descriptor are associated. Therefore, with the above manners, the user profile mapping device 321 correlates the ID to the personalized feature descriptor.

Next, according to the obtained personalized feature descriptor, the personalized feature data preparation device 323 produces the presentation data that the IP telephone system may present to the user. For instance, the personalized feature descriptor may be as follows: the call for Joe is notified with the voice announcement of "Joe", the call for Mary with the music note of "Post Carriage" and the call for Mike with his facial picture plus regular phone ring. For this example, the presentation data, which are produced or obtained by the personalized feature data preparation device 323, are respectively the audio data of voice announcement of "Joe", the audio data of the music note of "Post Carriage", and Mike's facial picture data plus regular phone ring audio data. Music data such as the music note of "Post Carriage" and image data such as Mike's facial picture may be stored in the storage device 340.

The personalized feature presentation device 325 presents to the call's answerer the personalized feature which is prepared by the personalized feature data preparation device 323, so that the call's answerer can tell whether he/she is the callee of the call according to the presented personalized feature. The personalized feature presentation portion 320 may include a display screen such as LCD (not shown), which is used for showing to the user the personalized feature in the video form. The personalized feature presentation portion 320 may further include a speaker to play a phone ring as the personalized feature.

According to one embodiment of present invention, data in the user profile may correspond to more than one personalized features, therefore, in such as case, what the personalized feature presentation device 325 presents is the combination of these personalized features. For instance, on its display device, the personalized feature presentation device 325 may display at the same time two pictures which serves as personalized features respectively, or displays on its display device one picture as a personalized feature while playing on its speaker a phone ring as another personalized feature.

In one embodiment of present invention, the shared multi-user IP telephone device 35 may further includes a user registration portion 330. The user registration portion 330 receives user IDs and user instructions. According to the user instructions, it retrieves on the VoIP network or receives through the user registration portion 330 the user profile, and stores the user profile as data structure in the storage device 340. The user may also instruct the user registration portion 330 to delete from the storage device the registered user profile.

Specifically, the user registration portion 330 receives user ID and user instructions by one of the following means: short-range wireless communication (e.g. infrared, Bluetooth), plug-and-play USB (Universal Serial Bus), ID card, biotech and network log-in. If the user instructs the user registration portion 330 to receive the user profile by one the above means, the user registration portion 330 will continue to receive the user profile and send the user profile to the storage device 340 to be stored therein. If the user instructs the user registration portion 330 to retrieve or search for the corresponding user profile over the VoIP network, the user registration portion 330 will retrieve or search for the user profile over the VoIP network. For instance, the user profile may be retrieved from the SIP registration server. Then the retrieved or received user profile is sent to the storage device 340 to be stored therein.

In one embodiment, the user registration portion 330 further includes an access right configuration device 331 and verification device 333. Through the access right configuration device 331, special users may configure the access right of common users to the storage device. The verification device 333 is used for verifying the registering user's access right to the storage device when receiving user ID or before putting user profiles into the storage device. Only when the user has the right to access the storage device 340 will the user's registration request be accepted. If the user does not have the right to access the storage device 340, the registration will be denied.

Notably, the calling device 31 and the shared multi-user IP telephone device 35 may be independent from each other or be assembled together. The calling device 31 and the shared multi-user IP telephone device 35 may also be implemented in multimedia computers.

Again in reference to FIG. 3, according to one preferred embodiment of present invention, before the calling device 31 of the inventive IP telephone system initiates a call, the caller's and the callee's SIP addresses may be encapsulated in SIP packets through VoIP software. The ID extraction portion 310 extracts both the caller's and the callee's SIP addresses from the SIP packets encapsulating both the caller's and the callee's SIP addresses. Besides, according to both the caller's and the callee's SIP addresses, the personalized feature presentation portion 320 searches for the corresponding data record in the database stored in the storage device 340. The personalized feature presentation device 325 presents to the call's answerer the personalized features registered in the data record which is retrieved by the user profile mapping device 321 from the storage device 340, so that the call's answerer may determine whether he/she is the callee of the incoming call based on the presented personalized features.

Figure 4:
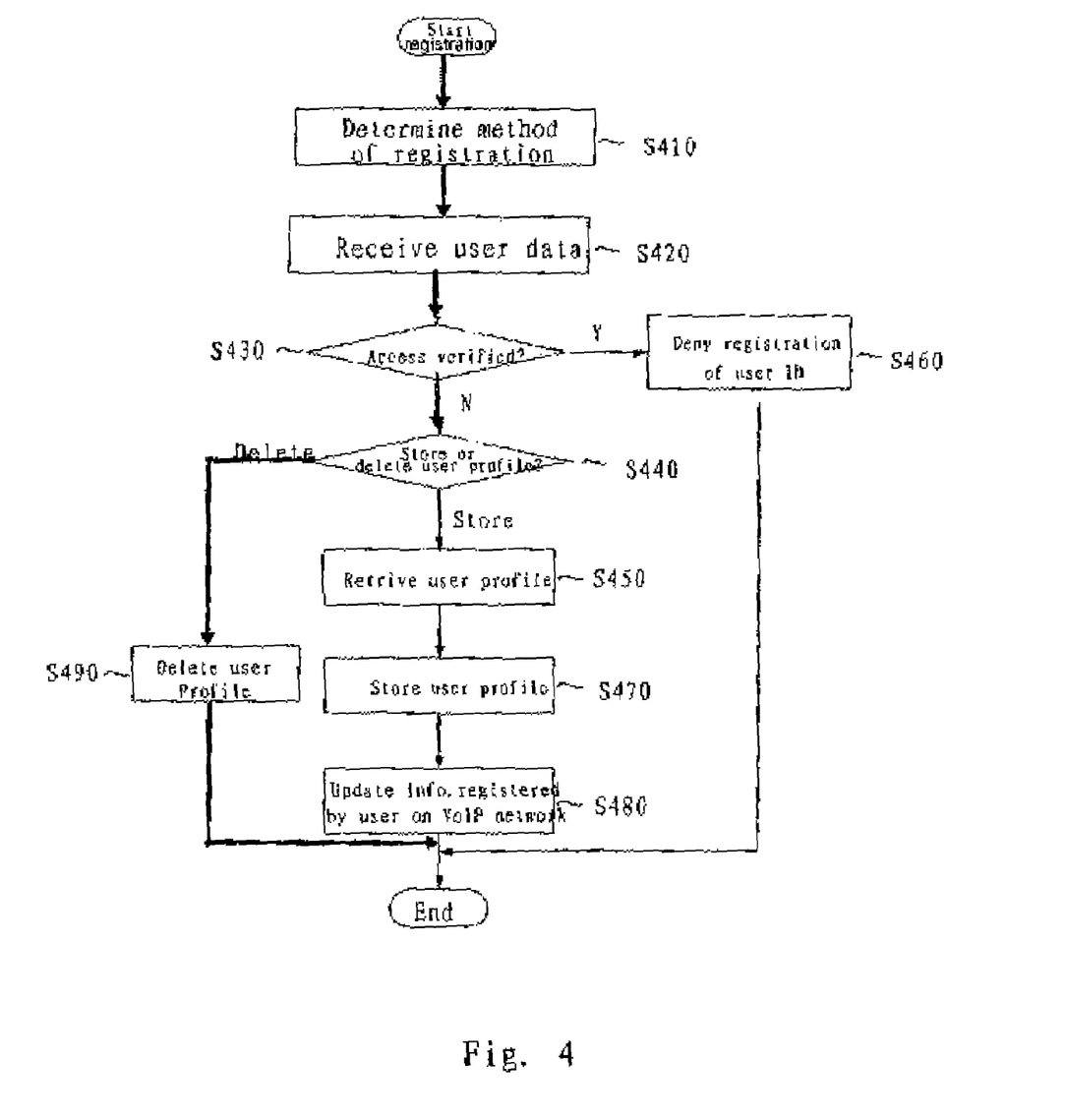
FIG. 4 illustrates the flowchart for registering user ID.

FIG. 4 illustrates the flowchart for registering user ID. In reference to FIG. 4, at S440, it is determined which method the user adopts to register (i.e. the manner to send data such as profiles to the storage device 340). The procedure proceeds to S440, where according to the determination result of S410, the user first sends a user ID to the storage device 340 through, for example, Bluetooth communication module, infrared communication module or other special communication module.

Next at S430, the user's right to access the device is verified based on the sent user ID. If the verification at S430 fails, i.e. the user has no right to access the device or the user does not have enough access right to support the required operation, the procedure will proceed to S460, where the registration is denied and the registration process ends.

If the verification at S430 passes, the procedure proceeds to S440, where the user's purpose for the access is determined as whether the user is ready to store user profiles (i.e. to register users) or delete user profiles which have been registered in the storage device 340. If the user wants to register user profiles in the storage device, the procedure proceeds to S450, where the device receives or retrieves user profiles. Here, the user profiles may be sent by the user's registering telephone, or obtained from the SIP registration server. In the latter case, the URL (Uniform Resource Locator) of the SIP registration server may be obtained from the user's registration information. Next at S470, the user profiles received or obtained at S450 are saved. At S480 is updated the user registration information in the VoIP network infrastructure. Then the procedure ends.

If the access purpose determined at S440 is to delete user profiles which have been registered in the storage device 340, the procedure proceeds to S490, where the user profiles already registered are deleted from the storage device. Then the procedure ends.

Figure 5:
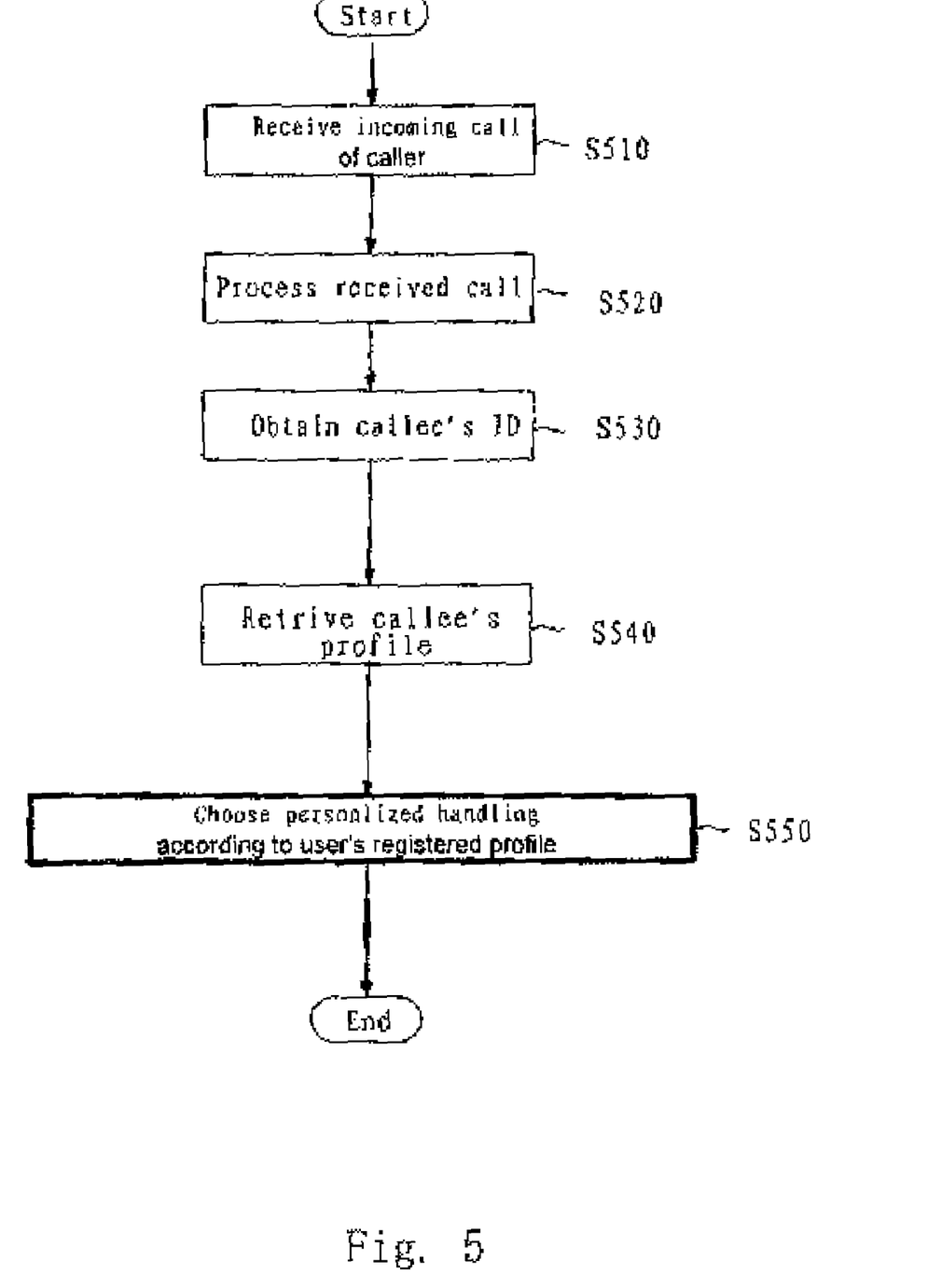
FIG. 5 illustrates the flowchart for handling incoming calls.

FIG. 5 illustrates the flowchart for handling incoming calls. In reference to FIG. 5, at S510, the caller call is received. At S520, conventional procedures are performed on the VoIP packets of incoming call received at S510. At S530 are obtained IDs contained in the VoIP packets processed at S520. Next at S540, the user profile is retrieved through the storage device 340.

At S550, the personalized handling is chosen according to the user profile. The handling may be playing a notification or personalized phone ring. Finally at S560 is performed the personalized handling chosen at S550. Then the incoming calls handling ends.

Figure 6:
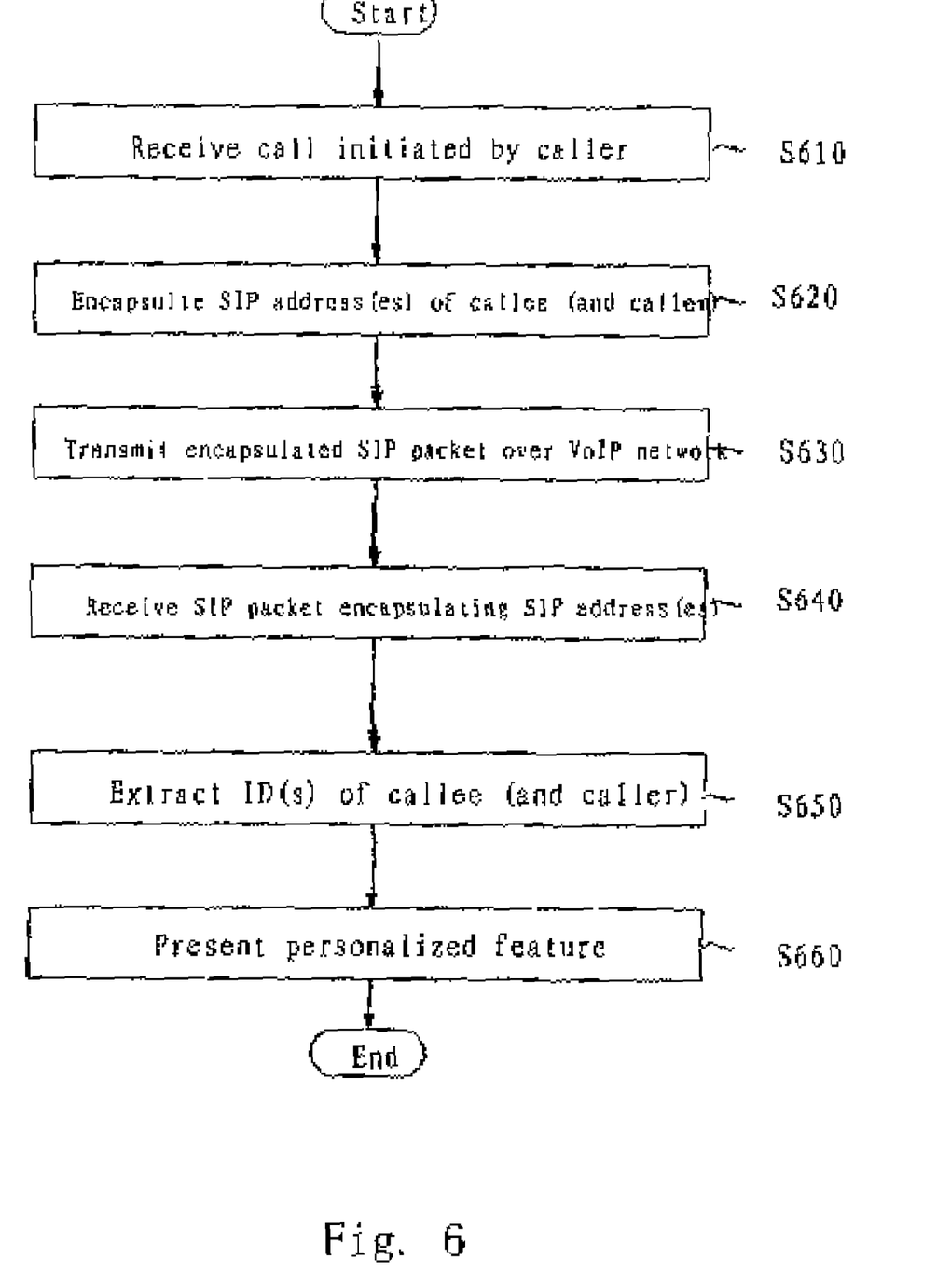
FIG. 6 illustrates the operation flow of an IP telephone system with several virtual telephones sharing a single IP address over VoIP network according to one embodiment of present invention.

FIG. 6 illustrates the operation flow of an IP telephone system with several virtual telephones sharing a single IP address over VoIP network according to one embodiment of present invention. In reference to FIG. 6, at S610, the callee's ID is received so as to initiate a call through the calling device 31.

Next at S620, the caller's call is encapsulated by VoIP software at the calling device 31. In the SIP packets are encapsulated the callee's SIP address.

Next at S630, the SIP packets encapsulating the callee's SIP address are transmitted via the VoIP network infrastructure 33 to the shared multi-user IP telephone device 35 where the callee has been registered.

At S640, the shared multi-user IP telephone device 35 receives the SIP packets encapsulating the callee's SIP address, and performs conventional processes on the input packets to output data containing the callee's ID.

At S650, the callee's ID is extracted from the data output by the receiving device 311. Next at S660, according to the callee's ID parsed out by the incoming call parsing device 313, the corresponding data record is retrieved from the storage device 340.

Finally at S670, the personalized feature presentation portion 320 presents to the call's answerer the personalized features searched, so that the answerer may determine whom the call is for.

Again in reference to FIG. 6, in one preferred embodiment of present invention, at S620, the calling device 31 encapsulates both the caller's and the callee's SIP addresses into SIP packets with VoIP software. At S650, both the caller's and the callee's IDs are extracted. Next at S660, the corresponding data record is retrieved from the storage device 340 according to both the caller's and the callee's IDs.

In comparison to the prior art, in the present invention, by way of one preferred embodiment, the callee's SIP address is associated with his/her personalized features and the caller sends the callee's SIP address to the shared muti-user telephone device 35, thus enabling the callee to determine whether the call is for him/her according to the personalized features presented upon incoming calls at the shared mutiuser telephone device 35. Therefore, the technical solution of present invention overcome the problems with the traditional shared multi-user telephone system, such as assigning someone to receive calls, causing noise and so on, thus reducing the operation cost for one telephone shared by several users and installed in a small office and so on.

The description herein are just illustrative and not exhaustive, and the present invention is not limited to the embodiment shown herein. Many modifications and alterations are obvious to a person of the art. The embodiment is chosen to illustrate the spirit and application of present invention so that a person of the art may understand the present invention, thus enabled to implement various embodiments with various adaptation to other applications speculated.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A shared multi-user IP telephone device which receives, based on SIP a call transmitted over a VoIP network, with the shared multi-user IP telephone device serving as a SIP user agent, and creating and managing a session between a caller and a callee according to SIP, wherein the shared multi-user IP telephone device comprises:

a storage device for storing associatively in the form of a database a user profile including a user ID and a personalized feature descriptor corresponding to the user ID;

an ID extraction portion for receiving from the VoIP network a SIP packet including at least the callee's ID, and extracting the ID contained in the SIP packet, wherein the ID is unique for every user on the VoIP network;

a user registration portion for receiving the user ID, receiving, deleting, or retrieving a corresponding user profile over the VoIP network according to a user instruction, and storing the corresponding user profile in the storage device; said user registration portion comprising:

an access right configuration device used to configure access rights for users of the storage device; and a verification device for storing the received or retrieved user profile in the storage device, or verifying the user's access right to the storage device before deleting the user profile from the storage device, and denying this registration operation if the user has no access right to the storage device; and a personalized feature presentation portion for searching in the storage device for the user profile corresponding to the ID according to the ID extracted by the ID extraction portion, for presenting the personalized feature according to the search result, wherein the SIP packet is the packet transmitted by the caller's calling device to the VoIP network following the manner; the calling device receives the callee's ID input by the caller, encapsulates at least the callee's ID in the SIP packet, and send the SIP packet to the VoIP network.

2. The shared multi-user IP telephone device as recited in claim 1, wherein the user profile stored in the database includes the user profile of a caller who may call the users of the shared multi-user IP telephone device.

3. The shared multi-user IP telephone device as recited in claim 1, wherein the SIP packet includes both the caller's and the callee's IDs, the ID extraction portion extracts both the caller's and the callee's IDs in the SIP packet, and the personalized feature presentation portion searches in the storage device for the user profile corresponding to both the caller's and the callee's IDs according to both the caller's and the callee's IDs extracted by the ID extraction portion, and presents the personalized feature according to the search result.

4. The shared multi-user IP telephone device as recited in claim 1, wherein the ID extraction portion includes:
   a receiving device for receiving from the VoIP network the SIP packet including at least the callee's ID; and
   an incoming call parsing device for extracting at least the callee's ID from the SIP packet output from the receiving device.

5. The shared multi-user IP telephone device as recited in claim 4, wherein the personalized feature presentation portion includes:
   a user profile mapping device for searching, according to the ID extracted by the ID extraction portion, for the user profile corresponding to the IDs in the storage device;
   a personalized feature preparation device for preparing presentation data of the personalized feature according to a personalized feature descriptor in the user profile searched by the user profile mapping device; and
   a personalized feature presentation device for presenting on the shared multi-user IP telephone device the presentation data of personalized feature prepared by the personalized feature preparation device.

6. The shared multi-user IP telephone device as recited in claim 1, wherein the personalized feature presentation portion includes a display screen for showing the personalized feature in a video form to the call answerer.

7. The shared multi-user IP telephone device as recited in claim 1, wherein the storage device keeps user profiles for at least two users.

8. The shared multi-user IP telephone device as recited in claim 1, wherein the user registration portion operates to receive the user ID and the user profile through a method for registering a user in a shared multi-user IP telephone device which includes a storage device, the method comprising: determining the method for receiving user data; receiving an ID and an instruction of the user with the determined receiving method; and receiving or retrieving an user profile and storing the user profile in the storage device, or deleting an user profile in the storage device, according to the user instruction.

9. An article of manufacture comprising a computer readable medium having computer readable program code means embodied therein for causing registration of a user in a shared multi-user IP telephone device, the computer readable program code means in said article of manufacture comprising computer readable program code means for causing a computer to effect the steps of claim 1.

10. A computer program product comprising a computer readable medium having computer readable program code means embodied therein for causing functions of a shared multi-user IP telephone device, the computer readable program code means in said computer program product comprising computer readable program code means for causing a computer to effect the functions of claim 1.

11. An IP telephone system that enables a shared multi-user IP telephone device to share a single physical IP address on a VoIP network, with every user on the VoIP network having a unique ID, comprising:
   a calling device for receiving at least the callee's ID and encapsulating it in a SIP packet, and transmitting the SIP packet to the VoIP network so that the SIP packet is routed through the VoIP network based on a SIP routing mechanism; and
   a shared multi-user IP telephone device for serving as a SIP user agent, creating and managing a session between the caller and the callee according to SIP, comprising:
      a storage device for storing associatively in the form of a database a user profile including a user ID and a personalized feature descriptor corresponding to the user ID, an ID extraction portion for receiving from the VoIP network the SIP packet, and extracting the ID contained in the SIP packet from the received SIP packet,
      a user registration portion for receiving the user ID, receiving, deleting, or retrieving a corresponding user profile over the VoIP network according to a user instruction, and storing the corresponding user profile in the storage device; said user registration portion comprising:
         an access right configuration device used to configure access rights for users of the storage device; and
         a verification device for storing the received or retrieved user profile in the storage device, or verifying the user's access right to the storage device before deleting the user profile from the storage device, and denying this registration operation if the user has no access right to the storage device; and
      a personalized feature presentation portion for searching in the storage device for the user profile corresponding to the ID according to the ID extracted by the ID extraction portion, for presenting the personalized feature according to the search result.

12. The IP telephone system as recited in claim 11, wherein the calling device receives both the caller's and the callee's IDs, and encapsulates them in the SIP packet.

13. The IP telephone system as recited in claim 11, wherein the user profile stored in the database includes the user profile of a caller who may call the users of the shared multi-user IP telephone device.

14. The IP telephone system as recited in claim 12, wherein the SIP packet includes both the caller's and the callee's IDs, the ID extraction portion extracts both the caller's and the callee's IDs in the SIP packet, and the personalized feature presentation portion searches in the storage device for the user profile corresponding to both the caller's and the callee's IDs according to both the caller's and the callee's IDs extracted by the ID extraction portion, and presents the personalized feature according to the search result.

15. The IP telephone system as recited in claim 11, wherein user profiles for at least two users are registered in the shared multi-user IP telephone device.

16. The IP telephone system as recited in claim 11, wherein at least two shared multi-user IP telephone devices are included and the user profile of one user is registered into the at least two shared multi-user IP telephone devices.

17. A method for a shared multiuser IP telephone device to share a single physical IP address on a VoIP network, with every user on the VoIP network having a unique ID, comprising:
   managing a session between a caller and a callee according to SIP, wherein the managing step comprises steps of:
      using a storage device for storing associatively in a form of a database a user profile comprising a user ID and a personalized feature descriptor corresponding to the user ID;
      using an ID extraction unit for receiving from the VoIP network a SIP packet comprising at least the callee's ID and encapsulating it in a SIP packet, and
      using the ID extraction unit for extracting the ID contained in the SIP packet from the SIP packet received over the VoIP network;
      using a user registration unit for retrieving for the user profile corresponding to the ID according to the extracted ID, using an access right configuration unit for verifying the user's access right to the storage device before deleting the user profile from the storage device, and for denying the registration if the user has no access right to the storage device;

using a personalized feature presentation unit for producing and presenting a personalized feature according to the search result, wherein the producing step comprises searching in the storage device for the user profile corresponding to the ID extracted by the ID extraction unit; and transmitting the SIP packet to the VoIP network so that the SIP packet is routed through the VoIP network based on a SIP routing mechanism.

18. The method as recited in claim 17, wherein the step of receiving the ID includes receiving both the caller's and the callee's IDs, and encapsulating them in the SIP packet.

19. The method as recited in claim 17, wherein the user profile stored in the database includes the user profile of a caller who may call the users of the shared multi-user IP telephone device.

* * * * *